(12) United States Patent
Gambut-Garel et al.

(10) Patent No.: US 8,293,403 B2
(45) Date of Patent: Oct. 23, 2012

(54) CROSSLINKABLE COMPOSITION FOR A BATTERY ELECTROLYTE

(75) Inventors: Lucile Gambut-Garel, Lyons (FR); Catherine George, Saint Genis les Ollieres (FR); Carroll Vergelati, Saint Baudille de la Tour (FR); Jean-Marc Pujol, Rilleux (FR)

(73) Assignee: Rhodia Chimie, Aubervilliers (FR)

( * ) Notice: Subject to any disclaimer, the term of this patent is extended or adjusted under 35 U.S.C. 154(b) by 995 days.

(21) Appl. No.: 10/553,058

(22) PCT Filed: Mar. 23, 2004

(86) PCT No.: PCT/FR2004/000709
§ 371 (c)(1),
(2), (4) Date: Apr. 6, 2007

(87) PCT Pub. No.: WO2004/090038
PCT Pub. Date: Oct. 21, 2004

(65) Prior Publication Data
US 2009/0035655 A1    Feb. 5, 2009

(30) Foreign Application Priority Data
Apr. 3, 2003  (FR) ..................... 03 04157

(51) Int. Cl.
*H01M 6/00* (2006.01)
*H01M 6/04* (2006.01)
*H01M 6/14* (2006.01)

(52) U.S. Cl. ................ 429/189; 429/188; 429/303

(58) Field of Classification Search ............ 429/189, 429/307, 313
See application file for complete search history.

(56) References Cited

U.S. PATENT DOCUMENTS
2002/0051911 A1 * 5/2002 Okada .................... 429/313

FOREIGN PATENT DOCUMENTS
EP    0 372 584 B1    6/1990
JP    02 024976 A     1/1990
JP    05 098169 A     4/1993

* cited by examiner

*Primary Examiner* — Raymond Alejandro
*Assistant Examiner* — Steven Scully
(74) *Attorney, Agent, or Firm* — SNR Denton US LLP

(57) ABSTRACT

The field of the present invention relates to the field of batteries and of polymer electrolytes for batteries and more particularly to the field of lithium batteries.

The invention relates to a composition which can be polymerized and/or crosslinked by polyaddition for a battery electrolyte comprising:

a) at least one polyorganosiloxane (POS) (A) exhibiting, per molecule, at least two $C_2$-$C_6$ alkenyl groups bonded to silicon and at least one group directly bonded to a silicon atom comprising a polyoxyalkylene (Poa) ether functional group;
b) at least one polyorganosiloxane (POS) (B) exhibiting, per molecule, at least two hydrogen atoms bonded to silicon;
c) a catalytically effective amount of at least one hydrosilylation catalyst (C); and
a) at least one electrolyte salt (D).

24 Claims, No Drawings

CROSSLINKABLE COMPOSITION FOR A BATTERY ELECTROLYTE

CROSS-REFERENCE TO RELATED APPLICATIONS

This application is a 35 U.S.C. §371 application of International Application No. PCT/FR2004/000709, filed Mar. 23, 2004, published in French as WO 2004/090038 on Oct. 21, 2004, and claims priority of French Application No. 03/04157, filed Apr. 3, 2003, the disclosures of both applications being incorporated herein in their entirety.

BACKGROUND

1. Field of the Invention

The field of the present invention relates to the field of batteries and of polymer electrolytes for batteries and more particularly to the field of lithium batteries.

More specifically, a subject matter of the present invention is a novel polymerizable and/or crosslinkable composition for a battery electrolyte, a novel polymer electrolyte obtained by polymerization and/or crosslinking of this novel composition, and a novel polymer battery.

2. Description of Related Art

Historically, lead batteries have been the most commonly used. However, there were numerous disadvantages to the lead technology, related to the weight of the batteries, to the unreliability during operation and to the use of a corrosive liquid. This led to the development of alkaline batteries, the electrodes of which were either based on nickel and cadmium (nickel-cadmium batteries), or based on zinc and nickel oxide (zinc-nickel batteries), or based on silver oxide coupled to zinc, cadmium or iron (silver oxide batteries). All these technologies use a potassium hydroxide solution as electrolyte and exhibit the major disadvantage of a low energy density by weight with regard to the requirements related to the development of portable devices. Thus it is that manufacturers have developed a new industry based on lithium batteries using a negative electrode based on lithium metal (hence the name "lithium metal battery"). However, problems related to poor restoration of the negative lithium electrode during successive chargings quickly resulted in a novel type of negative electrode based on carbon, used as insertion compound for lithium (hence the name "lithium ion battery").

The operating principle for lithium batteries is summarized in the following way:

During the electrochemical charging, the transition metal ions of the positive electrode are oxidized, which results in the deintercalation of the lithium. Electrons are forced to move through the external circuit and a molar equivalent amount of lithium ions passes through the electrolyte, which is an ionic conductor and electronic insulator. This makes possible the intercalation of the lithium at the negative electrode. During the discharge of the battery, that is to say during use, it is the reverse phenomenon which occurs spontaneously.

In batteries, the ionic conductor or electrolyte, which separates the electrodes, is a key component. First, its state, liquid, solid or gelled, affects the safety of the system and, secondly, its conductivity determines the operating temperature range. Liquid electrolytes based on carbonates are commonly used. However, they do not exhibit the optimum safety conditions related to the handling of a corrosive liquid. This is because this type of battery can be the site of episodes, such as a thermal runaway, resulting in the formation of gas, thus increasing the internal pressure of the battery and the risk of explosion. It is for this reason that strict safety standards require manufacturers to use sophisticated cases, thus increasing the cost price of a unit.

In order to overcome this major disadvantage, the battery industry has developed a novel technology based on solid polymer electrolytes comprising a lithium anode, hence the name of "lithium polymer battery". Due to its solid nature and being in the form of a film, this novel type of electrolyte makes possible the development of a safer battery which has a greater variety of shapes. The thinness of the films formed makes possible an increase in the energy efficiency at a low current density. One of the first "dry polymers" studied was polyoxyethylene for transportation applications. However, one of the major disadvantages of this type of polymer is related to the low levels of conductivity of this type of polymer for use at ambient temperature and a fortiori at low temperatures. The battery industry is therefore in search of novel polymer electrolytes having sufficient levels of conductivity for use within a suitable temperature range extending from $-20°$ to $+80°$ C.

SUMMARY OF THE INVENTION

The experts concerned have thus attempted to develop novel polymer electrolytes. By way of illustration, international application WO 2000/25323 discloses a composition which can be crosslinked to form a battery polymer electrolyte comprising a polyorganosiloxane (POS) composed of polyoxyethylene groups or of cyclic carbonates groups having at least two reactive SiH groups, a POS crosslinking agent having at least two reactive groups of alkenyl type (SiVi), a hydrosilylation catalyst and an electrolyte salt. This composition is crosslinked thermally by heating between 70 and 100° C. for a time of approximately 6 hours to produce an electrolyte polymer. This reference does not exhibit a composition comprising a POS functionalized both by polyether and vinyl groups which is crosslinked by a POS comprising an SiH functional group in the presence of a hydrosilylation catalyst and of an electrolyte salt. This technological alternative form is desirable for the industry of the field under consideration as it opens the route to novel polymer electrolytes.

This is because the industry of the field under consideration is waiting for novel compositions for a battery electrolyte which make it possible to obtain electrolyte polymers having sufficient levels of conductivity for use within a suitable temperature range extending from $-20°$ to $+80°$ C.

DETAILED DESCRIPTION OF THE INVENTION

The main object of the present invention is thus to provide a novel polymerizable and/or crosslinkable composition for a battery polymer electrolyte which makes it possible to obtain electrolyte polymers having sufficient levels of conductivity for use within a suitable temperature range extending from $-20°$ to $+80°$ C.

The invention is also targeted at the production of a solid polymer electrolyte by polymerization and/or crosslinking of the composition according to the invention.

Another aim of the invention is to provide a polymer battery and more particularly a lithium polymer battery.

These objects, among others, are achieved by the present invention, which relates to a composition which can be polymerized and/or crosslinked by polyaddition for a battery electrolyte comprising:

a) at least one polyorganosiloxane (POS) (A) exhibiting, per molecule, at least two $C_2$-$C_6$ alkenyl groups bonded to silicon and at least one group directly bonded to a silicon atom comprising a polyoxyalkylene (Poa) ether functional group;

b) at least one polyorganosiloxane (POS) (B) exhibiting, per molecule, at least two hydrogen atoms bonded to silicon;

c) a catalytically effective amount of at least one hydrosilylation catalyst (C); and d) at least one electrolyte salt (D).

The expression "polymerizable and/or crosslinkable composition" means that the composition according to the invention has an ability to polymerize and/or crosslink at ambient temperature or under heat by polyaddition reactions, essentially by reaction of hydrosilyl (SiH) groups with alkenylsilyl groups. The hydrosilylation reaction between these silicone reactive units results in the formation of $\equiv$Si—O—Si$\equiv$ bonds, resulting in the formation of networks.

The term "effective amount of at least one hydrosilylation catalyst (C)" is understood to mean, within the meaning of the invention, the amount sufficient to initiate the polymerization and/or crosslinking. This amount should be as small as possible in order to make possible better storage over time of the composition. Any catalyst capable of initiating a polyaddition reaction may be suitable. For example, mention may be made of catalysts based on platinum, ruthenium or rhodium. Catalysts based on platinum are particularly suitable for this type of reaction and are disclosed in patents U.S. Pat. Nos. 2,823,218, 2,970,150, 3,775,452, FR 2 825 709 and FR 2 801 887.

Conventionally, the hydrosilylation reactions which allow silicones to crosslink are catalyzed by platinum catalysts (see, for example, patents U.S. Pat. No. 2,823,218 and U.S. Pat. No. 2,970,150). In practice, the majority of industrial hydrosilylation reactions are catalyzed by the Karstedt solution, which is composed of platinum complexes in which the platinum is at the 0 oxidation state. The general formula of the Karstedt complex is $Pt_2$(tetramethyldivinylsiloxane)$_3$. This conventional catalyst and its preparation are disclosed in patent U.S. Pat. No. 3,775,452. Other catalysts used according to the invention are based on platinum complexes and are disclosed in patent applications FR 2 825 709 and FR 2 801 887.

Preferably, the proportions of the POS (A) and of the POS (B) are such that the ratio of the number of the hydrogen atoms bonded to silicon in the POS (B) to the number of alkenyl radicals contributed by the POS (A) is between 0.4 and 10.

According to a specific form of the invention, the polyoxyalkylene (Poa) ether functional group of the POS (A) is of polyoxyethylene ether and/or polyoxy-propylene ether type.

Compositions which can be polymerized and/or crosslinked by polyaddition for a battery electrolyte which are preferred in the context of the present invention are those in which the POS (A) is a polyfunctional POS comprising:

a) per molecule, at least two alkenyl functional groups;

b) at least two identical or different units of formula (I):

in which:

the R symbols, which are identical or different, each represent a monovalent hydrocarbon group chosen from a linear or branched alkyl radical having from 1 to 6 carbon atoms, a cycloalkyl radical having from 5 to 8 carbon atoms, an alkoxyl radical and a phenyl radical;

the Y symbols, which are identical or different, each represent an $R^1$-Poa group where the $R^1$ symbol represents a radical comprising from 2 to 50 carbon atoms and the Poa symbol represents a group of polyoxyalkylene ether type, preferably polyoxyethylene and/or polyoxypropylene ether type;

the X symbols, which are identical or different, each represent a $C_2$-$C_6$ alkenyl functional group bonded to silicon, preferably vinyl or allyl;

the symbols a and b are identical or different numbers which can take 0, 1, 2 or 3 as value;

the c symbol is 0 or 1; and the sum a+b+c being other than zero and $\leq 3$; and c) optionally at least one siloxyl unit of formula $R_k SiO_{(4-k)/2}$, the R symbol having the same definition as above and k being a number between 1 and 3.

The —$R^1$-Poa groups are advantageously chosen from the following groups:

—$(CH_2)_3$—O—$(CH_2CH_2$—O$)_m$—$CH_3$;   —$(CH_2)_2$—O—$(CH_2CH_2$—O$)_m$—$CH_3$;

—$(CH_2)_3$—O—$(CH(CH_3)$—$CH_2$—O$)_m$—$CH_3$  and
—$(CH_2)_2$—O—$(CH(CH_3)$—$CH_2$—O$)_m$—$CH_3$ with m$\leq$14 and preferably between 6 and 12.

Compositions which are particularly preferred in the context of the present invention are those in which the POS (A) is an essentially linear random or block copolymer with the following mean general formula (II):

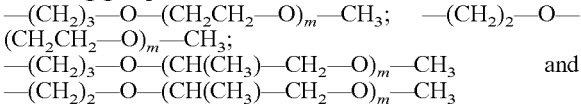

which can comprise units of formula $RSiO_{3/2}$ (T) (the maximum % of T units will be determined so that the composition remains in a liquid form), in which formula:

the R symbols, which are identical or different, each represent a monovalent hydrocarbon group chosen from a linear or branched alkyl radical having from 1 to 6 carbon atoms, a cycloalkyl radical having from 5 to 8 carbon atoms, an alkoxyl radical and a phenyl radical;

the Y symbols, which are identical or different, each represent an $R^1$-Poa group where the $R^1$ symbol represents a radical comprising from 2 to 50 carbon atoms and the Poa symbol represents a group of polyoxyalkylene ether type, preferably polyoxyethylene and/or polyoxypropylene ether type;

the X symbols, which are identical or different, each represent a $C_2$-$C_6$ alkenyl functional group bonded to silicon, preferably vinyl or allyl;

the A symbols, which are identical or different, each represent an R symbol, an X symbol or a Y symbol, the said symbols having the same definitions as above;

m is an integer or fractional number greater than or equal to 0;

n is an integer or fractional number greater than or equal to 1; and o is an integer or fractional number greater than or equal to 2.

Advantageously:

m is an integer or fractional number greater than or equal to 0 and less than or equal to 200, preferably between 10 and 100 and more preferably still between 20 and 40;

n is an integer or fractional number greater than or equal to 1 and less than or equal to 200, preferably between 10 and 100 and more preferably still between 20 and 40; and o is an integer or fractional number greater than or equal to 2 and less than or equal to 200, preferably between 5 and 50 and more preferably still between 5 and 20.

According to a particular form of the invention, the number of units carrying the alkenyl functional group X is chosen so that the alkenyl functional groups X represent a content, expressed as % with respect to the total weight of the POS (A), of between 0.5 and 5%.

Other compositions which can be polymerized and/or crosslinked by polyaddition for a battery electrolyte which are preferred in the context of the present invention are also those in which the POS (B) comprises:
a) at least two identical or different units of formula (III):

(III)

in which formula:
the R symbols, which are identical or different, each represent a hydrogen, a monovalent hydrocarbon group chosen from a linear or branched alkyl radical having from 1 to 6 carbon atoms, a cycloalkyl radical having from 5 to 8 carbon atoms and a phenyl radical; and
x is a number between 1 and 3 inclusive; and
b) optionally at least one siloxyl unit of formula $R_k SiO_{(4-k)/2}$, the R symbol having the same definition as above and k being a number between 1 and 3.

Advantageously, the POS (B) is an essentially linear random or block copolymer with the following mean general formula (IV):

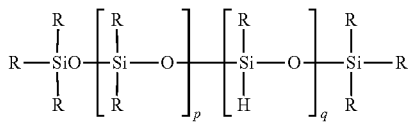

in which formula:
the R symbols, which are identical or different, each represent a hydrogen, a monovalent hydrocarbon group chosen from a linear or branched alkyl radical having from 1 to 6 carbon atoms, a cycloalkyl radical having from 5 to 8 carbon atoms and a phenyl radical;
p is an integer or fractional number greater than or equal to 0, preferably between 0 and 200, and more preferably still between 0 and 50; and
q is an integer or fractional number greater than or equal to 2 which can optionally be equal to 0, preferably between 0 and 200 and more preferably still between 0 and 50; with the condition that, when q=0, then the two end M groups carry a hydrogen directly bonded to the silicon atom.

According to a noteworthy characteristic of the invention, the electrolyte salt (D) is composed:
of a cation chosen from the group consisting of the following entities: metal cations, ammonium ions, amidinium ions and guanidinium ions; and
of an anion chosen from the group consisting of the following entities: chloride ions, bromide ions, iodide ions, perchlorate ions, thiocyanate ions, tetrafluoroborate ions, nitrate ions, $AsF_6^-$, $PF_6^-$, stearylsulfonate ions, trifluoromethanesulfonate ions, octylsulfonate ions, dodecyl-benzenesulfonate ions, $R^4SO_3^-$, $(R^4SO_2)(R^5SO_2)N^-$ and $(R^4SO_2)(R^5SO_2)(R^6SO_2)C^-$; in each formula, the $R^4$, $R^5$ and $R^6$ radicals are identical or different and represent electron-withdrawing groups.

Advantageously, the $R^4$, $R^5$ and $R^6$ radicals are chosen from electron-withdrawing groups of perfluoroaryl or perfluoroalkyl type, the perfluoroalkyl group comprising from 1 to 6 carbon atoms.

According to an alternative form of the invention, the electrolyte salt (D) comprises a metal cation chosen from alkali metals and alkaline earth metals of Groups 1 and 2 of the Periodic Table [Chem. & Eng. News, vol. 63, No. 5, 26, of Feb. 4, 1985]. In particular, the metal cation is either of lithium type or is chosen from transition metals, for example manganese, iron, cobalt, nickel, copper, zinc, calcium or silver. The electrolyte salts of lithium type of use according to the invention can be chosen from the group consisting of the following compounds:
$LiClO_4$, $LiBF_4$, $LiPF_6$, $LiAsF_6$, $LiCF_3SO_3$, $LiN(CF_3SO_2)_2$, $LiN(C_2F_5SO_2)_2$ and a mixture of these compounds.

Preferably, the amount of lithium electrolyte salt of the composition is defined so that the O/Li molar ratio is between 15 and 40, preferably between 10 and 30 and more preferably still between 20 and 25.

Although the electrolyte according to the invention is a solid polymer after crosslinking and/or polymerization, the teaching of the invention is not limited to a solid alone. This is because it is possible to add, to the composition, an organic electrolyte (E) in order to obtain, after crosslinking and/or polymerization, a liquid or gelled form. The choice will preferably fall on the compounds chosen from the group consisting of propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether.

The invention also relates to a polymer electrolyte for a battery obtained by polymerization and/or crosslinking by the polyaddition route (hydrosilylation reaction) of the polymerizable and/or crosslinkable composition according to the invention described above. Said polyaddition can optionally be initiated by thermal activation of the catalyst (C). Depending on the type of catalyst used to initiate the reaction, it may be necessary to heat the reaction medium to temperatures of greater than 65° C. Use will preferably be made of temperatures of between 70 and 130° C. The catalyst (C) can be employed as is or in solution in the solvent. Generally, it is sufficient to introduce, into the reaction medium, less than 1000 ppm, preferably less than 100 ppm, better still less than 50 ppm, of platinum-based catalyst (C), calculated with respect to the total weight of the unsaturated compound and of the compound comprising Si—H units.

The solvents which can be used for the catalysts are very numerous and highly varied and are chosen according to the catalyst used and the other constituents of the composition thus prepared. Generally, the solvents can be aliphatic hydrocarbons (such as pentane, hexane, heptane, pentamethylheptane or petroleum distillation fractions); aromatic hydrocarbons (such as benzene, toluene and xylenes: ortho-xylene, para-xylene and meta-xylene); halogenated aliphatic or aromatic hydrocarbons (such as tetrachloroethylene); or ethers (such as tetrahydrofuran or dioxane).

Generally, the molar ratio of the unsaturations to the Si—H bonds varies between 1:100 and 10:1. The reaction time required varies according to the type of catalyst and the temperature used for the reaction.

The composition according to the invention can also comprise reinforcing agents in order to improve the mechanical properties of the polymer electrolyte obtained after polymerization and/or crosslinking. For example, the composition according to the invention can optionally comprise treated silica, treated alumina or polyorganosiloxane resins.

Another subject matter of the invention is a battery comprising the polymer electrolyte obtained by polymerization and/or crosslinking described above placed between an anode and a cathode. Advantageously, at least one of the constituents of the cathode is chosen from the group consisting of the following entities:
lithium metal, lithium alloys, inorganic materials comprising lithium insertions and carbonate materials comprising lithium insertions.

The application of these batteries is particularly suitable for the following fields of storage of electricity: emergency power supplies for industrial and telecommunication systems, secondary power supplies for portable devices, batteries for geostationary satellite applications and batteries for electric and hybrid vehicles.

The following examples are given by way of illustration and they cannot be regarded as a limit on the scope of the invention.

EXAMPLES

Example 1

Preparation of Organohydropolysiloxanes of POS (A) Type a) Preparation of the Organohydropolysiloxane POS (A1)
The following are introduced into a 1 liter five-necked reactor equipped with a reflux condenser, a mechanical stirrer and a thermometer probe and under an argon headspace:
247.5 g (3.91 mol of SiH) of an oil comprising SiH units with the following structure (V):

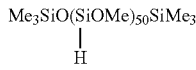

289.65 g (0.978 mol) of octamethyltetracyclosiloxane (D$_4$); and
12.65 g of a hexamethyldisiloxane oil of following formula (VI):

2.8 g (i.e., 0.5% by weight of the reaction mass) of a catalyst based on hydrochloric acid on a support (Tonsil) are subsequently added. The reaction mass is brought to 80° C. and the reaction is allowed to continue for 7 hours. The determination of the solids content makes it possible to monitor the progress of the reaction.

| Time | Level of volatile components (1 g, 150° C., 30') |
|---|---|
| 5' | 40.05 |
| 2 h 30 | 82.3 |
| 7 h | 87.9 |
| 7 h 30 | 87.9 |

The stability of the solids content indicates that equilibrium has been achieved and that the reaction is complete. The reaction mass is subsequently filtered under pressure in order to remove the catalyst. 543.2 g of a clear colorless oil are thus collected. The reaction mass is subsequently heated to 170° C. and is then placed under vacuum in order to remove the volatile components (5 mbar for 5 hours). 457.6 g of a clear colorless oil assaying 7.06 mol of SiH units/kg are finally obtained. The $^1$H and $^{29}$Si NMR analyses confirm the following structure (VII):

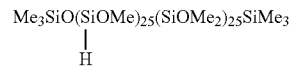

388.6 g (0.916 mol of allyl units) of allyl polyether with the reference MA 300 (from NOF) and 48.8 mg of Karstedt catalyst assaying 10% by weight of platinum are then introduced into a 1 liter five-necked reactor equipped with a reflux condenser, a dropping funnel, a mechanical stirrer and a thermometer probe and under an argon headspace. The reaction medium is brought to 90° C. and stirring is started. 100 g of the oil comprising SiH functional groups (VII) (0.706 mol of SiH functional groups) are then run onto the reaction medium over 3 h 30. After the oil has finished being run in, the degree of conversion of the SiH units, quantitatively determined by gasometry, is 98.5%. After 23 h, the degree of conversion is 100% and the reaction mass is cooled. 470.1 g of a mixture with a viscosity of 227.3 cPs at 25° C. composed of the intermediate oil POS (A-i) with the following structure (VIII):

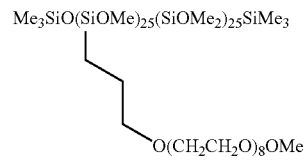

and of the excess polyether in the free or isomerized form are thus collected.

470.1 g of this oil POS (A-i) and 71 g (0.167 mol) of tetramethyltetravinylcyclotetrasiloxane of following formula (IX):

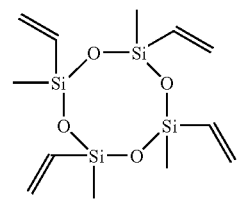

are then introduced into a 1 liter five-necked reactor equipped with a reflux condenser, a dropping funnel, a mechanical stirrer and a thermometer probe and under an argon headspace. 2.76 g (i.e., 0.5% by weight of the reaction mass) of a catalyst based on hydrochloric acid on a support (Tonsil) are subsequently added. The reaction mass is brought to 80° C. and the reaction is allowed to continue for 5 days.

The change in viscosity makes it possible to monitor the progress of the reaction.

| Time | Nature | Viscosity (cPs at 25° C.) |
|---|---|---|
| Starting | Polyether oil alone | 227.3 |
| Starting | Reaction mixture | 154.4 |
| 29 h | Reaction mixture | 214.8 |
| 30 h | Reaction mixture | 207.9 |
| 120 h | Reaction mixture | 208.9 |

The stability of the viscosity indicates that equilibrium has been achieved. The reaction mass is subsequently filtered under pressure in order to remove the catalyst. 422.9 g of an oil with a dark brown color are thus collected. The reaction mass is subsequently devolatilized in order to remove the volatile components resulting from the redistribution reaction (130° C. under 3 mbar for 5 hours and then at 160° C. under 3 mbar for 5 hours). After cooling, 359.6 g of an oil with a dark brown color are collected. The quantitative determination of the vinyl functional groups by ethoxylation indicates a content of vinyl functional groups of 1.9% by weight (expressed by weight 27 g). The $^1$H and $^{29}$Si NMR analyses confirm the final structure POS (A1):

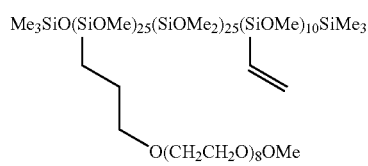

b) Preparation of the Organohydropolysiloxane POS (A2)—Reaction Scheme
1st Stage

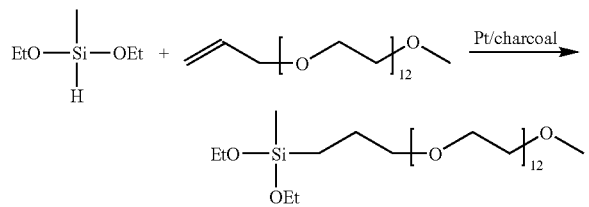

2nd Stage

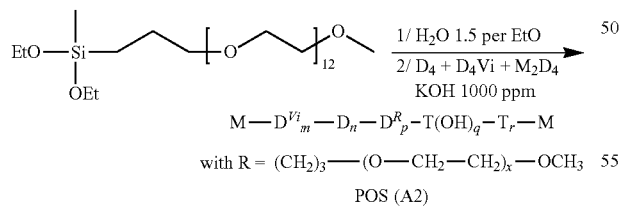

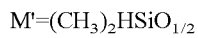

Procedure 1st stage 150 g of xylene and 1.2 g of platinum-on-charcoal (i.e., 100 ppm with respect to the reaction mass) are added to a 1 l reactor equipped with a stirrer of impeller type, with a reflux condenser followed by a bubbler and with a baffle (containing the temperature probe). The reaction medium is subsequently brought to 80° C. The predistilled silane (81.8 g) and the allyloxy polyether (218.2 g) are then run in simultaneously over 2 hours using peristaltic pumps. This reaction is carried out at approximately 80° C. under a nitrogen headspace and with mechanical stirring. The reaction is complete when the desired degree of conversion of the SiH groups (80%) is achieved; the heating and the stirring are then halted.

Filtration is then carried out through an aluminum filter equipped with a cellulose membrane covered with diatomaceous earth under nitrogen pressure. The volatile components are then distilled off under reduced pressure (approximately 5 mbar) and at 150° C. 217.3 g of product are obtained.

Procedure 2nd Stage

Units: $M=(CH_3)_3SiO_{1/2}$; $D=(CH_3)_2SiO_{2/2}$, $D^{Vi}=(CH_3)Si(vinyl)O_{2/2}$, $D(OR)=(Me_2)Si(OR)O_{1/2}$ 208.4 g of the silane functionalized by the polyoxyethylene ether functional group, obtained during the 1st stage, and 10.3 g of demineralized water are introduced into a 500 ml three-necked flask equipped with a mechanical stirrer and with a distillation column. The ethanol thus formed is immediately distilled off. Once hydrolysis is complete, the redistribution is carried out by adding 26.7 g of octamethylcyclotetrasiloxane ($D_4$), 8.8 g of an $MD_4M$ oil, 48.9 g of tetramethyltetravinylcyclotetrasiloxane ($D_4^{VI}$) and 0.32 g of potassium hydroxide in the solid form (i.e. 1000 ppm).

The reaction medium is then brought to 100° C. for 24 hours under an argon headspace. The product is then neutralized with 1.9 g of 15% silyl phosphate for 1 hour. The volatile components are subsequently removed under a reduced pressure of 5 mbar and at 100° C. This gives 258.4 g of product POS (A2) exhibiting the following weight distributions:

| Mn pst | 1310 |
|---|---|
| Mw pst | 2900 |

The structure of the product is characterized by NMR:
$M-D^{Vi}_m-D_n-D^R_p-T(OH)_q-T_r-M$
with $R=(CH_2)_3—(O—CH_2—CH_2)_x—OCH_3$ (the ends of chains are at 60% M and at 40% D(OR)).

| | m | n | p | q | r | x |
|---|---|---|---|---|---|---|
| POS (A2) | 20 | 16.2 | 10.4 | 0 | 0 | 12 |

Example 2

Preparation of the Polymer Electrolytes E1 and E2

$M'=(CH_3)_2HSiO_{1/2}$

The compositions according to the invention are prepared by mixing, using a turbine mixer:
a) a variable amount of a POS (A) prepared according to example 1,
b) a variable amount of LiTFSi salt (LiTFSI=lithium bistrifluoromethane-sulfonamide),
c) a variable amount of an M'M' POS (B) oil, so as to have an H/vinyl ratio of 1, and
d) 100 ppm of Karstedt platinum.

Crosslinking is carried out by thermal activation. When the reaction is complete, cooling is carried out and the recovery is carried out of the solid polymer electrolytes E1 and E2 in the film form.

Example 3

Measurement of the Ionic Conductivity of the Electrolytes E1 and E2

The ionic conductivity of the electrolytes E1 and E2 crosslinked according to example 2 and their changes with temperature were measured via the use of the complex impedance spectrometry technique, which technique makes it possible to determine the characteristic quantities of conductive systems, such as their resistance or their capacity.

The film of solid electrolyte is inserted and held fixed between two electrodes made of stainless steel, the entire combination constituting the main measurement cell. This experimental device is positioned inside an oven which makes possible temperature scanning between −20 and +80° C. The cell is connected to a Hewlett Packard HD4192A impedance meter coupled to a computer for recording the data. The cell is subjected to a sinusoidal voltage of 100 mV crest-to-crest within a frequency range extending from $5 \times 10^{-3}$ Hz to 13 MHz. For each sample, the measurement is carried out after maintaining at the set temperature for ¾ of an hour.

Under these conditions, the ionic conductivities of the electrolytes E1 and E2 at 25° C., as measured by the complex impedance method, are between $10^{-4}$ and $5 \times 10^{-6}$ siemens/cm.

What is claimed is:

1. A composition which can be polymerized and/or crosslinked by polyaddition for a battery electrolyte comprising:
    a) at least one polyorganosiloxane (POS) (A) which is an essentially linear random or block copolymer with the following mean general formula (II):

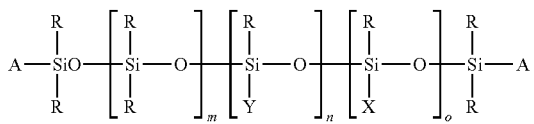

which can optionally comprise units of formula $RSiO_{3/2}(T)$, in which formula:
    the R symbols, which are identical or different, each represent a monovalent hydrocarbon group chosen from a linear or branched alkyl radical having from 1 to 6 carbon atoms, a cycloalkyl radical having from 5 to 8 carbon atoms, an alkoxyl radical and a phenyl radical;
    the Y symbols, which are identical or different, each represent an $R^1$-Poa group where the $R^1$ symbol represents a radical comprising from 2 to 50 carbon atoms and the Poa symbol represents a group of polyoxyalkylene ether type;
    the X symbols, which are identical or different, each represent a $C_2$-$C_6$ alkenyl functional group bonded to silicon;
    the A symbols, which are identical or different each represent an R symbol, an X symbol or a Y symbol, the said symbols having the same definitions as above;
    m is an integer or fractional number greater than or equal to 0;
    n is an integer or fractional number greater than or equal to 1; and
    o is an integer or fractional number between 5 and 50;

b) at least one polyorganosiloxane (POS) (B) exhibiting, per molecule, at least two hydrogen atoms bonded to silicon;
c) a catalytically effective amount of at least one hydrosilylation catalyst (C); and
d) at least one electrolyte salt (D).

2. The composition which can be polymerized and/or crosslinked by polyaddition for a battery electrolyte as claimed in claim 1, wherein the proportions of the POS (A) and of the POS (B) are such that the ratio of the number of the hydrogen atoms bonded to silicon in the POS (B) to the number of alkenyl radicals contributed by the POS (A) is between 0.4 and 10.

3. The composition which can be polymerized and/or crosslinked by polyaddition for a battery electrolyte as claimed in claim 1, wherein the polyoxyalkylene (Poa) ether functional group of the (POS) (A) is a polyoxyethylene ether and/or a polyoxypropylene ether.

4. The composition which can be polymerized and/or crosslinked by polyaddition for a battery electrolyte as claimed in claim 1, wherein:
    m is an integer or fractional number greater than or equal to 0 and less than or equal to 200;
    n is an integer or fractional number greater than or equal to 1 and less than or equal to 200; and
    o is an integer or fractional number greater than or equal to 2 and less than or equal to 200.

5. The composition which can be polymerized and/or crosslinked by polyaddition for a battery electrolyte as claimed in claim 1, wherein the number of units carrying the alkenyl functional group X is chosen so that the alkenyl functional groups X represent a content, expressed as % with respect to the total weight of the POS (A), of between 0.5 and 5%.

6. The composition which can be polymerized and/or crosslinked by polyaddition for a battery electrolyte as claimed in claim 1, wherein the POS (B) comprises:
    a) at least two identical or different units of formula (III)

in which formula:
    the R symbols, which are identical or different, each represent a monovalent hydrocarbon group chosen from a linear or branched alkyl radical having from 1 to 6 carbon atoms, a cycloalkyl radical having from 5 to 8 carbon atoms and a phenyl radical; and
    x is a number between 1 and 3 inclusive; and
    b) optionally at least one siloxyl unit of formula $R_kSiO_{(4-k)/2}$, the R symbol having the same definition as above and k being a number between 1 and 3.

7. The composition which can be polymerized and/or crosslinked by polyaddition for a battery electrolyte as claimed in claim 1, wherein the POS (B) is an essentially linear random or block copolymer with the following mean general formula (IV):

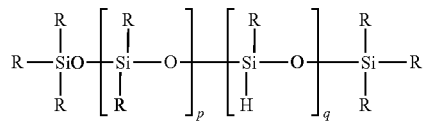

in which formula:
the R symbols, which are identical or different, each represent a hydrogen, a monovalent hydrocarbon group chosen from a linear or branched alkyl radical having from 1 to 6 carbon atoms, a cycloalkyl radical having from 5 to 8 carbon atoms, and a phenyl radical;
p is an integer or fractional number greater than or equal to 0; and
q is an integer or fractional number greater than or equal to 2 which can optionally be equal to 0, with the condition that, when q=0, then the two end M groups carry a hydrogen directly bonded to the silicon atom.

8. The composition which can be polymerized and/or crosslinked by polyaddition for a battery electrolyte as claimed in claim 1, wherein the electrolyte salt (D) comprises:
a cation selected from the group consisting of metal cations, ammonium ions, amidinium ions and guanidinium ions; and;
an anion selected from the group consisting of chloride ions, bromide ions, iodide ions, perchlorate ions, thiocyanate ions, tetrafluoroborate ions, nitrate ions, $AsF_6^-$, $PF_6^-$, stearylsulfonate ions, trifluoromethanesulfonate ions, octylsulfonate ions, dodecylbenzenesulfonate ions, $R^4SO_3$, $(R^4SO_2)(R^5SO_2)N^-$ and $(R^4SO_2)(R^5SO_2)(R^6SO_2)C^-$; in each formula, the $R^4$, $R^5$ and $R^6$ radicals are identical or different and represent electron-withdrawing groups.

9. The composition which can be polymerized and/or crosslinked by polyaddition for a battery electrolyte as claimed in claim 8, wherein the $R^4$, $R^5$ and $R^6$ radicals are perfluoroaryl radicals or perfluoroalkyl radicals, wherein the perfluoroalkyl group comprises from 1 to 6 carbon atoms.

10. The composition which can be polymerized and/or crosslinked by polyaddition for a battery electrolyte as claimed in claim 8, wherein the electrolyte salt (D) comprises a metal cation chosen from alkali metals and alkaline earth metals of Groups 1 and 2 of the Periodic Table.

11. The composition which can be polymerized and/or crosslinked by polyaddition for a battery electrolyte as claimed in claim 10, wherein the electrolyte salt (D) comprises a metal cation of lithium type.

12. The composition which can be polymerized and/or crosslinked by polyaddition for a battery electrolyte as claimed in claim 11, wherein the amount of the electrolyte salt (D) is determined so that the O/Li molar ratio is between 15 and 40.

13. The composition which can be polymerized and/or crosslinked by polyaddition for a battery electrolyte as claimed in claim 1, wherein the electrolyte salt (D) is selected from the group consisting of $LiClO_4$, $LiBF_4$, $LiPF_6$, $LiAsF_6$, $LiCF_3SO_3$, $LiN(CF_3SO_2)_2$, $Li(C_2F_5SO_2)_2$ and a mixture of these compounds.

14. The composition which can be polymerized and/or crosslinked by polyaddition for a battery electrolyte as claimed in claim 8, wherein the metal cation is a transition metal.

15. The composition which can be polymerized and/or crosslinked by polyaddition for a battery electrolyte as claimed in claim 14, wherein the metal cation is selected from the group consisting of manganese, iron, cobalt, nickel, copper, zinc, calcium and silver.

16. The composition which can be polymerized and/or crosslinked by polyaddition for a battery electrolyte as claimed in claim 1, wherein said composition further comprises an organic electrolyte (E).

17. The composition which can be polymerized and/or crosslinked by polyaddition for a battery electrolyte as claimed in claim 16, wherein the organic electrolyte (E) is selected from the group consisting of propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether.

18. The composition which can be polymerized and/or crosslinked by polyaddition for a battery electrolyte as claimed in claim 1, wherein the hydrosilylation catalyst (C) is based on platinum.

19. A polymer electrolyte for a battery obtained by polymerization and/or crosslinking by the polyaddition route, which polyaddition is optionally thermally activated, of a polymerizable and/or crosslinkable composition as claimed in claim 1.

20. A polymer battery comprising a polymer electrolyte as claimed in claim 19 positioned between an anode and a cathode.

21. The polymer battery as claimed in claim 20, wherein at least one of the constituents of the cathode is selected from the group consisting of lithium metal, lithium alloys, inorganic materials comprising lithium insertions and carbonate materials comprising lithium insertions.

22. The composition which can be polymerized and/or crosslinked by polyaddition for a battery electrolyte as claimed in claim 1, said composition, upon polymerization having a sufficient level of conductivity for use in a battery within a temperature range from −20° C. to +80° C.

23. The polymer electrolyte for a battery electrolyte as claimed in claim 19, said polymer electrolyte having a sufficient level of conductivity for use in a battery within a temperature range from −20° C. to +80° C.

24. The composition which can be polymerized and/or crosslinked by polyaddition for a battery electrolyte as claimed in claim 1, wherein said composition, upon polymerization has an ionic conductivity at 25° C., as measured by the complex impedance method, of between $10^{-4}$ and $5 \times 10^{-6}$ siemens/cm.

* * * * *